United States Patent
Müller et al.

(10) Patent No.: US 11,043,783 B2
(45) Date of Patent: Jun. 22, 2021

(54) OPTICAL ARRANGEMENT

(71) Applicants: Fraunhofer-Gesellschaft zur Förderung der Angewandten Forschung E.V., Munich (DE); Friedrich-Schiller-Universität Jena, Jena (DE)

(72) Inventors: Michael Müller, Jena (DE); Marco Kienel, Zwickau (DE); Arno Klenke, Jena (DE); Jens Limpert, Jena (DE); Andreas Tünnermann, Weimar (DE)

(73) Assignees: Fraunhoer-Gesellschaft zur Förderung der angewandten Forschung e.V., Munich (DE); Friedrich-Schiller-Universität Jena, Jena (DE)

( * ) Notice: Subject to any disclaimer, the term of this patent is extended or adjusted under 35 U.S.C. 154(b) by 391 days.

(21) Appl. No.: 16/065,829

(22) PCT Filed: Dec. 20, 2016

(86) PCT No.: PCT/EP2016/081976
§ 371 (c)(1),
(2) Date: Jun. 25, 2018

(87) PCT Pub. No.: WO2017/108825
PCT Pub. Date: Jun. 29, 2017

(65) Prior Publication Data
US 2019/0013637 A1    Jan. 10, 2019

(30) Foreign Application Priority Data
Dec. 23, 2015 (DE) .................. 10 2015 122 734.7

(51) Int. Cl.
*G02B 26/00* (2006.01)
*H01S 3/00* (2006.01)
(Continued)

(52) U.S. Cl.
CPC ............ *H01S 3/0057* (2013.01); *G02B 27/10* (2013.01); *G02B 27/283* (2013.01);
(Continued)

(58) Field of Classification Search
CPC ................................................. H01S 3/0057
(Continued)

(56) References Cited

FOREIGN PATENT DOCUMENTS

| WO | WO 2015/095751 | 6/2015 |
| WO | WO 2017/108825 | 5/2017 |

OTHER PUBLICATIONS

Marco Kienel et al. "multidimensional coherent pulse additions of ultrashort laser pulses". Optics Letters. Bd. 40, No. 4, Feb. 15, 2015 (Feb. 15, 2015), pp. 522-525, XP001593955 (Year: 2015).*
(Continued)

*Primary Examiner* — James C. Jones

(57) ABSTRACT

The invention relates to an optical arrangement having
  a division element which divides an input beam consisting of a sequence of temporally equidistant light pulses into two spatially separate partial beams,
  at least one optical element through which at least one of the partial beams propagates, and
  at least one combination element which spatially superimposes the partial beams in an output beam. It is the object of the present invention to show a method for increasing the pulse energy of light pulses which is improved in comparison with the prior art. The invention solves this problem by virtue of the fact that the combination element superimposes a number of the temporally successive light pulses in a single light pulse in the output beam. The invention also relates to a method for increasing the pulse energy of light pulses.

12 Claims, 3 Drawing Sheets

(51) Int. Cl.
   *G02B 27/10*    (2006.01)
   *G02B 27/28*    (2006.01)
   *H01S 3/067*    (2006.01)
   *H01S 3/23*     (2006.01)

(52) U.S. Cl.
   CPC ............ *H01S 3/0085* (2013.01); *H01S 3/067* (2013.01); *H01S 3/2308* (2013.01); *H01S 3/2383* (2013.01)

(58) Field of Classification Search
   USPC ........................................................ 359/238
   See application file for complete search history.

(56)            References Cited

OTHER PUBLICATIONS

International Search Report and the Written Opinion dated Apr. 10, 2017 From the International Searching Authority Re. Application No. PCT/EP2016/081976 and Its Translation of Search Report Into English. (14 Pages).
Haboucha et al. "Optical-Fiber Pulse Rate Multiplier for Ultralow Phase-Noise Signal Generation," Optics Letters 36(18): 3654-3656, Sep. 15, 2011.
Kienel et al. "Multidimensional Coherent Pulse Addition of Ultrashort Laser Pulses," Optics Letters 40(4): 522-525, Feb. 15, 2015.
Zaouter et al. "Femtosecond Fiber Chirped- and Divided-Pulse Amplification System," Optics Letters, 38(2): 106-108, 2013.

\* cited by examiner

OPTICAL ARRANGEMENT

RELATED APPLICATIONS

This application is a National Phase of PCT Patent Application No. PCT/EP2016/081976 having International filing date of Dec. 20, 2016, which claims the benefit of priority of German Patent Application No. 10 2015 122 734.7 filed on Dec. 23, 2015. The contents of the above applications are all incorporated by reference as if fully set forth herein in their entirety.

FIELD AND BACKGROUND OF THE INVENTION

The invention relates to an optical arrangement for superimposing a sequence of temporally equidistant successive light pulses within a light beam to a single light beam, said arrangement comprised of
- a division element which divides a light beam into two partial beams,
- at least one optical element through which at least one of the partial beams propagates, and
- a combination element which spatially superimposes the partial beams in a single beam.

Furthermore, the invention relates to a method for increasing the pulse energy of light pulses. In the following, light pulses are called pulses.

Owing to physical and technical limitations, pulse laser systems are limited in terms of pulse energies, pulse peak powers, and the mean power of pulses emitted. Some of these limitations, among others, are a destruction of system components due to high intensities and/or fluences of pulses. Besides, nonlinear effects such as a self phase modulation may vary the temporal shape of the pulse which may have a negative influence on parameters, e.g. pulse length, and which in view of the desired application may lead to impracticality.

Various approaches for avoiding these limitations in power rates are already described in prior art:

A) Reducing the Peak Intensity by Increasing the Pulse and/or Laser Beam in Temporal and/or Spatial Dimension The peak intensity of the pulse can be reduced by increasing the laser beam on its passage through the system components [1]. In the area of a fiber laser, this includes, among others, the increase of the core diameter for the signal beam. Additionally, a temporal stretching of pulses is possible by the aid of the Chirped-Pulse-Amplification (CPA) concept [2], which apart from reducing the peak intensity also enables a reduction of the peak power.

B) Use of Circular Polarization

By the use of circular polarization, the effective nonlinear coefficient in the material can be reduced which reduces the influence of nonlinear effects on the pulse [3].

C) Use of Spatial Pulse Division as Well as Combination

According to this procedure, a pulse is divided into several spatially separated pulses which in the relevant channels, e.g. in one optical amplifier each, are individually amplified [4] or spectrally broadened. [5]. A coherent combination into a single beam and/or single pulse takes place after this procedure. The average power of the combined laser beam as well as the energy of the combined pulses may range substantially above the limitations set by each individual channel.

D) Use of Temporal Pulse Division and/or Combination

According to the Divided-Pulse-Amplification (DPA) concept, an input pulse is divided prior to amplification in an optical amplifier into several temporally separated replicates. These are individually amplified in temporal succession [6] and/or spectrally broadened [7]. Then, the individual replicates are again combined to a single pulse. Therefore, the resulting pulse may have pulse parameters which range above the limitations of the laser system components (except for the combination element itself) for a single pulse.

E) Use of an Enhancement Resonator

In an enhancement resonator, several pulses of a pulse train emitted from a laser system are temporally superimposed [8]. Thereby, within this resonator, a circulating pulse is created which in comparison to input pulses may have substantially increased pulse peak powers and pulse energies.

F) Use of Low-Grade Gires-Tournois Interferometers

In a sequence of low-grade optical resonators, a sequence of light pulses within a light beam can be temporally superimposed [9]. The relative optical phase of the light pulses must be adjusted by an optical phase adjusting element from pulse to pulse. In this procedure, a pre-pulse relative to the temporally superimposed pulse is always generated. The superimposed pulse may have pulse parameters which range above the limitations of the laser system components (except for the combination elements themselves).

SUMMARY OF THE INVENTION

The invention relates to an improvement of nowadays known approaches on DPA (see D). According to these approaches, a division of a single pulse into one pulse train occurs at one point of the laser system. It is followed by an optical amplifier or a device for spectral broadening of the pulses. Ultimately, the pulses are again combined to a single output pulse. To realize this combination successfully, the pulses must have the largest possible temporal overlap and their phase must be matching (modulo $2\pi$). Otherwise, it will entail a reduction of the combination efficiency. Combination efficiency is defined as the ratio of the power in the generated pulse versus the entire emitted power of the laser system. The systems can be classified into passively stabilized systems and actively stabilized systems. In the first system, the same setup as the one utilized for combination is applied to divide the pulses, e.g. by a dual passage [10]. Since in sum, each of the pulse replicates passes through the same way from division to combination, the relevant path lengths are intrinsically equal and thus the pulses are in phase, unless they are influenced differently due to other effects in pulse propagation (e.g. by dispersion or nonlinear effects). However, it is possible only in limited extent to influence the pulse replicates individually. If different setups are utilized for the division and combination, then an active stabilization is necessary in order to adjust the path lengths in the combination and dividing step accordingly [11]. Here it is now possible to influence the individual pulse replicates, for example in order to counteract saturation effects in optical amplifiers and thus to achieve a better combination efficiency. However, the number of required components of the corresponding setups rises sharply in comparison to the case of a passively stabilized system.

The object of the present invention is to provide an improved method for increasing the pulse energy. Those prior art drawbacks outlined hereinabove, in particular the sharp rise in required optical components, are to be avoided as far as possible.

Based on an optical arrangement of the initially mentioned kind, the present invention proposes that the combination element superimposes a number of temporally successive pulses in a single pulse in the output beam.

Furthermore, the present invention solves this task by providing a method for increasing the pulse energy of light pulses, said method comprising the following steps:
- generating a pulse sequence comprised of a succession of temporally equidistant pulses in an input beam,
- dividing the input beam into two or more spatially separate partial beams,
- controlling the relative optical phase between the light pulses of the light pulse sequence in at least one of the spatially separate partial beams,
- transmission of at least one of the partial beams through at least one optical element hitherto limited by pulse peak power or pulse energy
- spatially superimposing the partial beams in an output beam.

According to the present invention, the temporally successive pulses are superimposed in a single pulse in the output beam.

In the approach described here, several pulses of a pulse train (hereinafter called input pulse train) emitted from a laser system and temporally separated are combined to a single pulse by the aid of a suitable arrangement. A separate step of dividing a single pulse into several pulse replicates does not take place any longer. The input pulse train should consist of N pulses, where N is a power of the number 2 (N=2, 4, 8, . . . ). The individual pulses are temporally equidistant, which for example is the case with pulses that are emitted from mode-locked laser oscillators.

To achieve the intended combination of pulses, a spatial division of the input pulse train into two spatially separate partial beams takes place at first, wherein one optical element each may be located, e.g. an optical amplifier and/or several spatially separate amplifiers (with a corresponding pulse division and combination). Instead of optical amplifiers, it is also possible here to utilize components for spectral broadening or other optical components. In these two partial beams, relative phases are preferably imposed on the pulse trains via a suitable mechanism, e.g. by the aid of electro-optical modulators. A relative phase of its own is allocated to each light pulse within the pulse train, the entirety of which is hereinafter designated as (static) phase pattern and whose derivation will be explained later hereinafter. Via an arrangement of intensity beam splitters or polarization beam splitters and waveplates, it is possible to combine the two spatially separate beams into a single output beam and the temporally separate pulses of the pulse trains by the aid of optical delay sections having a suitable length to a single light pulse. Accordingly, $\log_2(N)$ delay sections of different length are required for N pulses. The shortest one of the delay sections generates a propagation time difference which corresponds to the minimal temporal interval of two pulses within the pulse train. All further delay sections each are twice as long as the preceding one. Accordingly, the phase patterns to be applied take the effect that the pulses in the spatially superimposed beam are temporally superimposed to a single pulse. The spatial sequence of delay sections can be chosen randomly by utilizing the relevant correct phase pattern. If additional temporally varying phase differences exist between the individual pulses of the input pulse train, these can be offset by modifying the static phase patterns imposed by the modulators with dynamic phase patterns. Moreover, the lengths of the individual routes in the combination arrangement should be adapted to the temporal pulse intervals. This can be realized by an active controlling of the relevant path lengths by means of suitable adjusting elements as well as by modifying the input pulse train by the aid of existing or additionally implemented phase modulators.

The designated static phase patterns can be derived by the imaginary splitting of a single light pulse into the pulse sequences of the two partial beams by inverse propagation through the elements for temporal and spatial superposition. The relative optical phase of each single pulse within a pulse train accordingly results by counting the required reflections at beam splitters which is needed for generating this pulse. The number of reflections is multiplied by the term $\pi/2$ and divided by $2\pi$ with a remainder (modulo $2\pi$). Another possible way of calculating is given by the differential coding algorithm which is explained later in connection with a practical example.

In a preferred embodiment of the present invention, two or more spatially separated optical elements are provided for, with one of the partial beams each propagating through each of the optical elements. Thereby, the pulses of both partial beams can be influenced completely separately from each other. The setup can be realized fiber-based.

In a possible embodiment, at least one of the optical elements can be an optical amplifier, a nonlinear optical element for spectral broadening, a lens, a mirror, or a light modulator.

Furthermore, as has been mentioned hereinabove, a phase matching element influencing the phase of the radiation of at least one partial beam should be provided in each partial beam upstream or downstream of the optical element. The phase matching element can favorably be a phase modulator (e.g. an electro-optical modulator) which varies the relative phase of the pulses from light pulse to light pulse and thereby imposes the demanded phase patterns on the pulse trains.

Expediently, the combination element comprises two or more beam splitters arranged one behind the other in the beam direction, wherein the pulses pass through delay sections between the beam splitters. For the superposition of N-successive pulses, $\log_2(N)$ delay sections must be provided for. The delay sections should have different lengths so that the pulses brought to superposition at one of the beam splitters and fed to this beam splitter via the differently long delay sections have a suitable temporal delay relative to each other so that in result the temporally successive pulses of the input pulse train are superimposed in the output pulse train.

Preferably, at least one adjusting element is provided for adjusting and controlling the superposition of pulses which is suitable for adjusting the length of one of the delay sections allocated to this adjusting element. Expediently allocated to each beam splitter couple of the combination element is such an adjusting element that adjusts the length of one of the (two) delay sections between the beam splitters.

BRIEF DESCRIPTION OF THE SEVERAL VIEWS OF THE DRAWINGS

Practical examples of the present invention are elucidated in greater detail hereinafter by way of drawing, where.

DESCRIPTION OF SPECIFIC EMBODIMENTS
OF THE INVENTION

Figure 1:
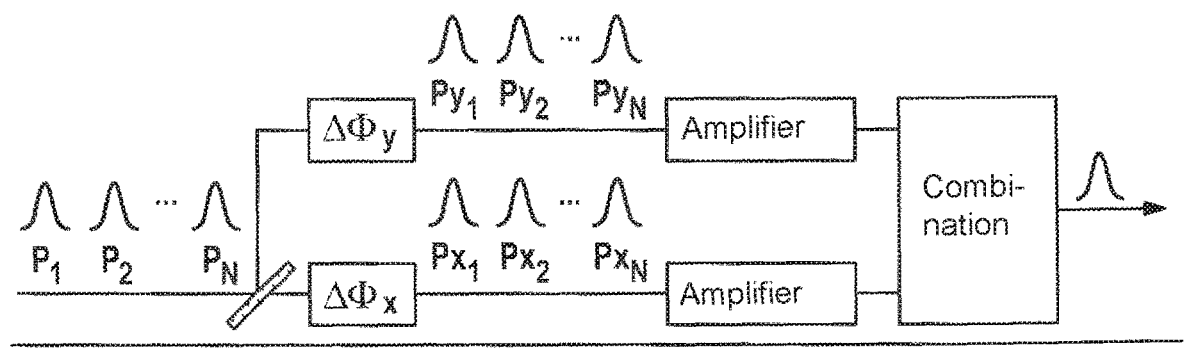
FIG. 1: shows an optical arrangement for the division of an input pulse train into two spatially separated channels with one phase modulator each.

Illustrated in FIG. 1 is the setup for dividing an input pulse train consisting of N pulses $P_1$-$P_N$ into two spatially separated partial beams with the pulses $Px_N$ and/or $Py_N$ each with one phase modulator $\Delta\Phi_x$ and $\Delta\Phi_y$ which generates the corresponding phase patterns for the succeeding spatial and temporal combination. As an example, each channel contains one optical amplifier.

Instead of optical amplifiers, it is also possible here to utilize components for spectral broadening or other optical components. In both partial beams, temporally static phase patterns are imposed on the pulse trains each via a suitable mechanism, e.g. by the aid of electro-optical modulators. A phase of its own is allocated to each light pulse of the pulse train. Via an arrangement of intensity beam splitters or polarization beam splitters and waveplates, the two spatially separated beams in a single output beam and the temporally separated pulses of the pulse trains are combined by optical delay sections to a single light pulse. Accordingly, $\log_2(N)$ delay sections are required for N pulses. Each of these delay sections generates a difference of propagation times for the pulses. In this example, the propagation differences of these sections, viewed from the input pulse train, are always halved, with the shortest propagation time difference being equivalent to the temporal interval of two successive pulses of the input pulse train. In general, the spatial sequence of the delay sections can be chosen randomly, utilizing the phase pattern required in each case.

Figure 2:
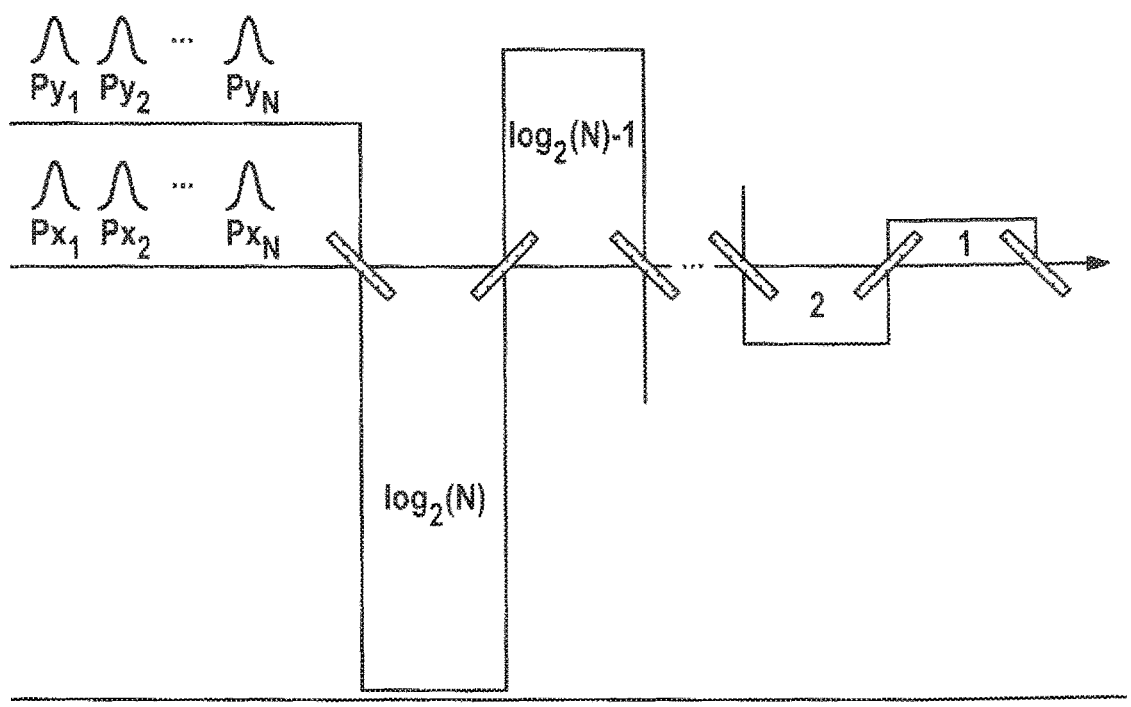
FIG. 2: shows an optical arrangement for the combination by the aid of intensity beam splitters for N pulse replicates.

In FIG. 2, the setup for the combination by the aid of intensity beam splitters for N pulses is illustrated as an example. Designated as intensity beam splitters are optical components which divide an input pulse into two pulses while maintaining the polarization properties. Such a component, in turn, can also be utilized as combination element in order to combine two input pulses having the same polarization properties into one light pulse. In most cases, the ratio of pulse energies of the pulses is 1:1, but it can also be chosen to have a different ratio in certain cases. It is assumed that a phase shift of $\pi/2$ occurs on each reflection at one of these beam splitters.

Figure 3:
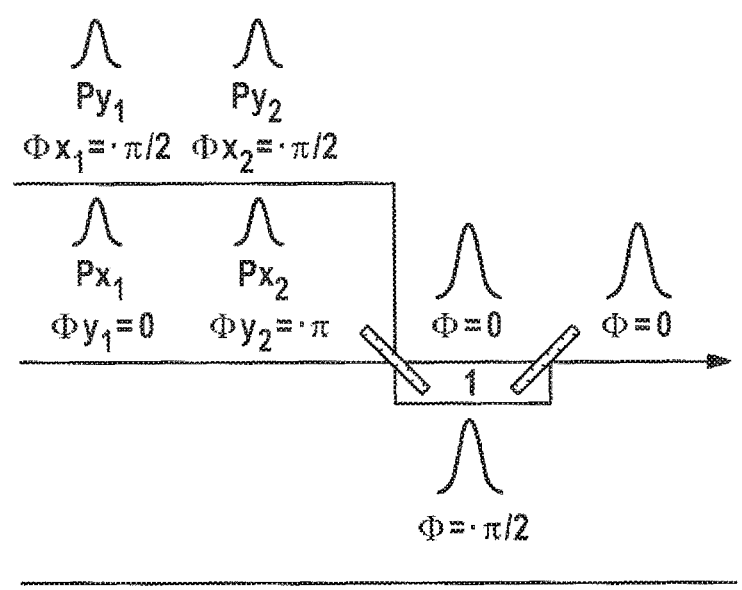
FIG. 3: shows an optical arrangement according to FIG. 2 for 3 pulse replicates.

As an example, one may contemplate a setup with N=2 input pulses as illustrated in FIG. 3. This requires a delay section. The two input pulses $Px_2$ and $Py_2$ interfere according to the relevant adjusted phase at the first intensity beam splitter constructively for the succeeding long path of the delay section 1, and destructively for the short path, considering the occurring phase shift. The opposite happens accordingly for the pulses $Px_1$ and $Py_1$. Thus, only one light pulse each exists in both paths of the delay section 1. These two pulses interfere constructively at the second intensity beam splitter in the output direction to a single light pulse. Accordingly, the number of input pulses and delay sections can be increased.

In the case for N pulses and a sequence of optical delay sections of descending length, the static phase pattern to be established for the two spatially separated pulse trains can be calculated according to the algorithm already explained or also by the aid of the differential coding algorithm. For the latter, the temporally separated pulses $Px_i$ and $Py_i$ (first and second spatial pulse train) with the numbers 0 to N−1 are numbered in binary notation, with N−1 being the temporally first light pulse and 0 being the temporally last light pulse. Added to these values is the number N in order to handle the second spatial pulse train $Py_i$. For the first spatial pulse train $Px_i$, no addition is made but a leading 0 is supplemented to the number in binary notation. The bit patterns $Xx_i$ and $Xy_i$ for the i-th light pulse are calculated by the aid of the differential coding algorithm from the lowest-valued to the highest-valued bit, commencing with an imaginary 0. The number of set bits in the bit patterns is multiplied by the value −$\pi/2$ in order to calculate the corresponding phases $\Phi x_i$ and $\Phi y_i$ for each light pulse. A corresponding example for 4 temporal pulses is illustrated in Table 1.

TABLE 1

| | Phase pattern for the combination of 4 temporal pulses by the aid of intensity beam splitters | | | | | | |
|---|---|---|---|---|---|---|---|
| Pulse | Pulse in binary notation | Pulse + leading 0 for pulse train $Px_i$ | Pulse + number N for pulse train $Py_i$ | Differential coding pattern $Xx_i$ for pulse train $Px_i$ | Differential coding pattern $Xy_i$ for pulse train $Py_i$ | $\Phi x_i$ | $\Phi y_i$ |
| 1 | 00 | 000 | 100 | 000 | 100 | 0 | −$\pi/2$ |
| 2 | 01 | 001 | 101 | 011 | 111 | −$\pi$ | −$3\pi/2$ |
| 3 | 10 | 010 | 110 | 110 | 010 | −$\pi$ | −$\pi/2$ |
| 4 | 11 | 011 | 111 | 101 | 001 | −$\pi$ | −$\pi/2$ |

Figure 4:
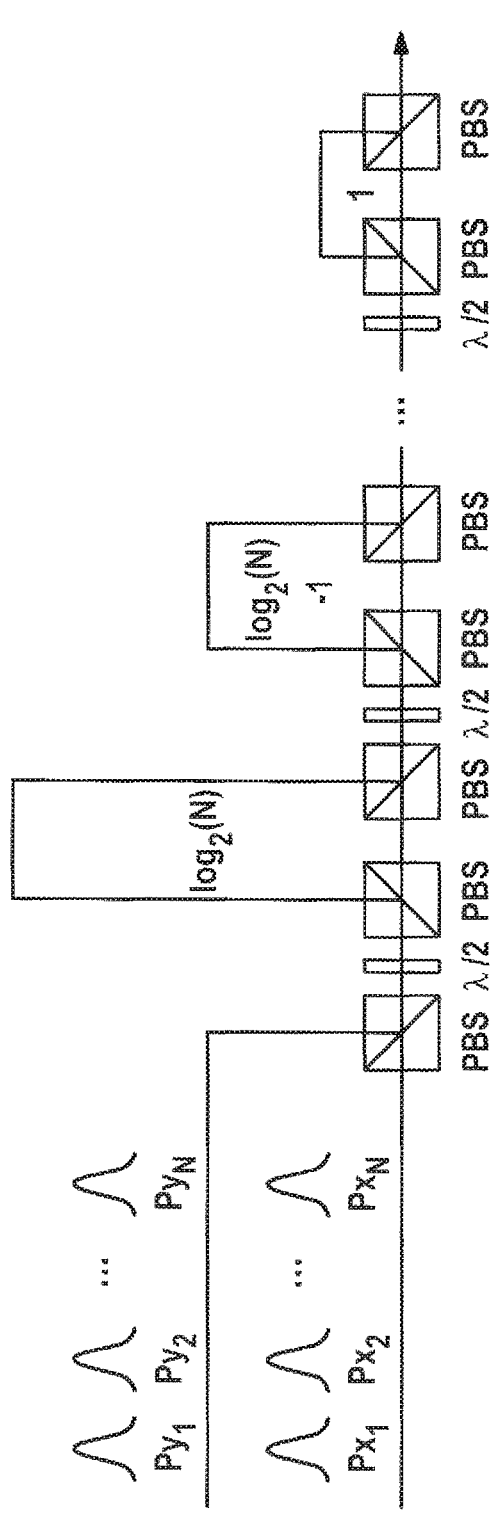
FIG. 4: shows an optical arrangement for the combination by the aid of polarization beam splitters for N pulse replicates.

In the general case of a disordered sequence of optical delay sections, by way of a theoretical inversion of the combination process, the phase pattern can Illustrated in FIG. 4 is the setup for the combination by the aid of polarization beam splitters PBS for N pulse replicates.

Designated as polarization beam splitters are optical components which divide an input pulse based on its polarization status into two pulse replicates, e.g. reflecting the s-polarized component and transmitting the p-polarized component. Again, it is assumed that a phase shift of $\pi/2$ occurs on each reflection at one of these beam splitters. Via half-waveplates having an angle of 22.5° relative to the p-polarization axis, it results a rotation of the input polarization of a p-polarized and/or s-polarized input pulse to angles of 45° and/or −45° relative to the p-polarization axis. Thus, with a succeeding polarization beam splitter, it results a division into two pulses having a ratio of 1:1. Like in the setup with intensity beam splitters, this combination of a beam splitter and a half-waveplate can be utilized as a combination element for 2 input pulses. Thereby, the setup with intensity beam splitters can be transferred to polarization beam splitters. Accordingly, the pulse trains $Px_i$ and $Py_i$ at the input are p-polarized and/or s-polarized, hence downstream of the first polarization beam splitter it results a pulse train with N pulses, each of which having its own polarization status depending on the static phase patterns. The required phase patterns for both pulse trains $Px_i$ and $Py_i$ can be calculated for a setup according to FIG. 4 in the same manner as for the combination with intensity beam splitters according to FIG. 3 based on the algorithms described in the previous paragraphs.

PRIOR ART CITED IN THE DESCRIPTION ABOVE

1. J. Limpert, F. Stutzki, F. Jansen, H.-J. Otto, T. Eidam, C. Jauregui, and A. Tünnermann, "Yb-doped large-pitch fibres: effective single-mode operation based on higher-order mode delocalisation," Light Sci. Appl. 1, e8 (2012).
2. D. Strickland and G. Mourou, "Compression of amplified chirped optical pulses," Opt. Commun. 56, 219-221 (1985).
3. D. N. Schimpf, T. Eidam, E. Seise, S. Hädrich, J. Limpert, and A. Tünnermann, "Circular versus linear polarization in laser-amplifiers with Kerr-nonlinearity.," Opt. Express 17, 18774-81 (2009).
4. T. Y. Fan, "Laser beam combining for high-power, high-radiance sources," IEEE J. Sel. Top. Quantum Electron. 11, 567-577 (2005).
5. A. Klenke, S. Hädrich, M. Kienel, T. Eidam, J. Limpert, and A. Tünnermann, "Coherent combination of spectrally broadened femtosecond pulses for nonlinear compression.," Opt. Lett. 39, 3520-2 (2014).
6. S. Zhou, F. W. Wise, and D. G. Ouzounov, "Divided-pulse amplification of ultrashort pulses," Opt. Lett. 32, 871 (2007).
7. A. Klenke, M. Kienel, T. Eidam, S. Hädrich, J. Limpert, and A. Tünnermann, "Divided-pulse nonlinear compression," Opt. Lett. 38, 4593-6 (2013).
8. I. Pupeza, T. Eidam, J. Rauschenberger, B. Bernhardt, A. Ozawa, E. Fill, A. Apolonski, T. Udem, J. Limpert, Z. A. Alahmed, A. M. Azzeer, A. Tünnermann, T. W. Hänsch, and F. Krausz, "Power scaling of a high-repetition-rate enhancement cavity," Opt. Lett. 35, 2052-2054 (2010).
9. Tong Zhou, John Ruppe, Cheng Zhu, I-Ning Hu, John Nees, and Almantas Galvanauskas, "Coherent pulse stacking amplification using low-finesse Gires-Tournois interferometers," Opt. Express 23, 6, 7442-7462 (2015)
10. F. Guichard, Y. Zaouter, M. Hanna, K.-L. Mai, F. Morin, C. Hönninger, E. Mottay, and P. Georges, "High-energy chirped- and divided-pulse Sagnac femtosecond fiber amplifier.," Opt. Lett. 40, 89-92 (2015).
11. M. Kienel, A. Klenke, T. Eidam, S. Hädrich, J. Limpert, and A. Tünnermann, "Energy scaling of femtosecond amplifiers using actively controlled divided-pulse amplification.," Opt. Lett. 39, 1049-52 (2014).

What is claimed is:

1. Optical arrangement for superimposing a sequence of N temporally equidistant successive light pulses within a light beam to a single light beam, said arrangement comprised of
    a division element which divides a light beam into two partial beams,
    at least one optical element through which at least one of the partial beams propagates,
    at least one phase matching element arranged in beam direction upstream or downstream of the optical element for influencing a phase of radiation from at least one partial beam, wherein said phase matching element is a phase modulator which varies phases of pulses from light pulse to light pulse, and
    at least one combination element, which comprises two or more beam splitters arranged one behind the other in beam direction, and which spatially superimposes the partial beams in a single beam, wherein the light pulses pass through $\log_2(N)$ delay sections of different lengths between the beam splitters,
    wherein the combination element superimposes a number of temporally successive pulses in a single light pulse in the output beam.

2. Optical arrangement according to claim 1, characterized by two or more spatially separated optical elements, wherein one of the partial beams each propagates through each of the optical elements.

3. Optical arrangement according to claim 2, characterized in that the optical elements are optical fibers, wherein each of the fibers conducts one of the partial beams each.

4. Optical arrangement according to claim 1, characterized in that the at least one optical element is an optical amplifier, a nonlinear optical element for spectral broadening, a mirror, a light modulator or a lens.

5. Optical arrangement according to claim 1, characterized by at least one adjusting element suitable for adjusting the length of a delay section allocated to this adjusting element.

6. Optical arrangement according to claim 1, characterized in that the beam splitters are polarization beam splitters, with there being half-waveplates arranged between the beam splitters.

7. Optical arrangement according to claim 1, characterized in that the beam splitters are intensity beam splitters.

8. Method for increasing the pulse energy of light pulses, said method comprising the following steps:
    generating a pulse sequence comprised of a succession of temporally equidistant pulses in an input beam,
    dividing the input beam into two or more spatially separate partial beams,
    spatially superimposing the partial beams in an output beam,
    wherein the pulse phases are controlled in at least one of the partial beams from light pulse to light pulse, wherein the light pulses pass through $\log_2(N)$ delay sections of different lengths between beam splitters that are arranged one behind the other in beam direction, and wherein a number of temporally successive light pulses are superimposed in a single light pulse in the output beam.

9. Method according to claim 8, characterized in that the superimposing of light pulses in the output beam is carried out by means of two or more beam splitters arranged one behind the other in beam direction.

10. Method according to claim 9, characterized in that the light pulses pass through delay sections of different length between the beam splitters.

11. Method according to claim 8, comprising determining a relative phase for each individual light pulse by dividing with remainder by $2\pi$ of the product from the number of reflections at beam splitters for this light pulse with $\pi/2$.

12. Method according to claim 8, comprising determining a relative phase for each individual light pulse by applying a differential coding algorithm.

* * * * *

UNITED STATES PATENT AND TRADEMARK OFFICE
CERTIFICATE OF CORRECTION

PATENT NO. : 11,043,783 B2  
APPLICATION NO. : 16/065829  
DATED : June 22, 2021  
INVENTOR(S) : Michael Müller et al.

Page 1 of 1

It is certified that error appears in the above-identified patent and that said Letters Patent is hereby corrected as shown below:

On the Title Page

Item (73) Assignees, Line 1:
"Fraunhoer-Gesellschaft zur" should be changed to -- Fraunhofer-Gesellschaft zur --

Signed and Sealed this  
Eleventh Day of January, 2022

Drew Hirshfeld  
*Performing the Functions and Duties of the*  
*Under Secretary of Commerce for Intellectual Property and*  
*Director of the United States Patent and Trademark Office*